United States Patent [19]

Yoda et al.

[11] Patent Number: 5,038,348
[45] Date of Patent: Aug. 6, 1991

[54] APPARATUS FOR DEBUGGING A DATA FLOW PROGRAM

[75] Inventors: Kazuhiko Yoda, Nara; Toshiya Okamoto, Souraku; Shinichi Yoshida, Kashihara, all of Japan

[73] Assignee: Sharp Kabushiki Kaisha, Osaka, Japan

[21] Appl. No.: 374,060

[22] Filed: Jun. 30, 1989

[30] Foreign Application Priority Data

Jul. 1, 1988 [JP] Japan ................................. 63-165689
Jul. 1, 1988 [JP] Japan ................................. 63-165690

[51] Int. Cl.⁵ ................................. G06F 11/00/11/28
[52] U.S. Cl. ......................................... 371/19; 364/200
[58] Field of Search ............. 371/19, 15.1; 200/67 A; 364/200

[56] References Cited

U.S. PATENT DOCUMENTS 4,423,508 12/1983 Shiozaki et al. ...................... 371/19
4,755,997 7/1988 Takahashi ............................. 371/19
4,802,165 1/1989 Ream .................................... 371/19

OTHER PUBLICATIONS

LeBlanc and Mellor-Crummey, "Debugging Parallel Programs with Instant Replay", Apr. 1987 IEEE Transactions on Computers.

*Primary Examiner*—Jerry Smith
*Assistant Examiner*—Allen M. Lo

[57] ABSTRACT

An apparatus for debugging a data flow program simulates functions corresponding to a plurality of structural portions of a processing apparatus in accordance with a data flow program stored in a program file. The state of execution corresponding to respective lines of a source program of the executed plurality of functional portions are stored in a PS file and the processes in respective functional portions and the states of execution employed for the execution of the source program are stored in a data packet file. A debug information file (22) stores the debug information indicative of the corresponding relation between the respective lines of the source program and respective nodes of the data flow program. A display displays debug information in association with respective lines of the source program in accordance with the execution of respective nodes of the data flow program.

4 Claims, 8 Drawing Sheets

BASIC STRUCTURE OF A DATA PACKET

| LINE No. | PROGRAM |
|---|---|
| 1 | main(inp;out) |
| 2 | input int inp; |
| 3 | output int out; |
| 4 | { |
| 5 | int a=10; |
| 6 | int b=20; |
| 7 | int c=4; |
| 8 | int w,x,y; |
| 9 | |
| 10 | x=inp+a+b*c; |
| 11 | w=c+x; |
| 12 | y=(b+c)*x; |
| 13 | z=w+x; |
| 14 | out=z+y; |
| 15 | } |

```
        700
         ⌐        810
NODE 10:        ⌐              ⌐820              ⌐830
         VARIABLE   NOT EXECUTED LINE   EXECUTED LINE
         inp        ;                    2(1),10(1);
         a          ;                    5(10),10(10);
         b          12;                  6(20),10(20);
         c          11,12;               7(4),10(4);
         w          11,13;               ;
         x          11,12,13;            10(91);
         y          12,14;               ;
         z          13,14;               ;
701      out        14;
  ⌐                ⌐811              ⌐821             ⌐831
NODE 13:
         VARIABLE   NOT EXECUTED LINE   EXECUTED LINE
         inp        ;                    2(1),10(1);
         a          ;                    5(10),10(10);
         b          12;                  6(20),10(20);
         c          12;                  7(4),10(4),11(4);
         w          13;                  11(95);
         x          12;13;               10(91);11(91);
         y          12;14;               ;
         z          13;14;               ;
         out        14;                  ;
702      :          :                    :
  ⌐                ⌐812             ⌐822              ⌐832
NODE 16:
         VARIABLE   NOT EXECUTED LINE   EXECUTED LINE
         inp        ;                    2(1),10(1);
         a          ;                    5(10),10(10);
         b          ;                    6(20),10(20);12(20);
         c          ;                    7(4),10(4),11(4),12(4);
         w          ;                    11(95),12(95),13(95);
         x          ;                    10(91),11(91),12(95),13(95);
         y          ;                    12(2184),14(2184);
         z          ;                    13(186),14(186);
         out        ;                    14(2370);
```

APPARATUS FOR DEBUGGING A DATA FLOW PROGRAM

BACKGROUND OF THE INVENTION

1. Field of the Invention

The present invention relates to an apparatus for debugging a data flow program, and more specifically, to a debugging apparatus capable of debugging a source program by indicating contents or variables of respective lines of a source program which is developed into a data flow program.

2. Description of the Related Art

Most of the conventional computers comprise von Neumann type computer with various instructions are stored as a program in a program memory and addresses of the program memory are successively designated by a program counter to successively read and execute the instructions.

Another type of the conventional computers, which have a data flow type information, processing apparatus and is a non-von Neumann computer, do not employ the idea of successive execution of instructions by the program counter. Such a data flow type information processing apparatus has an architecture on the premise that the instructions are processed in parallel, in which the execution of an instruction is permitted as soon as all the data for calculation are prepared, and a plurality of instructions are simultaneously executed dependent on the data, as a result the program is carried out in parallel in accordance with a natural flow of the data. Consequently, the time required for the operation can be significantly reduced., FIG. 1 is a schematic block diagram illustrating an example of a conventional data flow type information processing apparatus, FIG. 2 illustrates a basic structure of a data packet circulating respective portions of the information processing apparatus illustrated in FIG. 1, and FIG. 3 illustrates a portion of a data flow program stored in the program memory.

The structure and the operation of the data flow type information processing apparatus will be briefly described with reference to FIGS. 1, 2 and 3. The data packet illustrated in FIG. 2 has a destination field loaded with destination information, an instruction field loaded with instruction information and a data 1 field and a data 2 field, either one of which is loaded with operand data.

Figure 1:
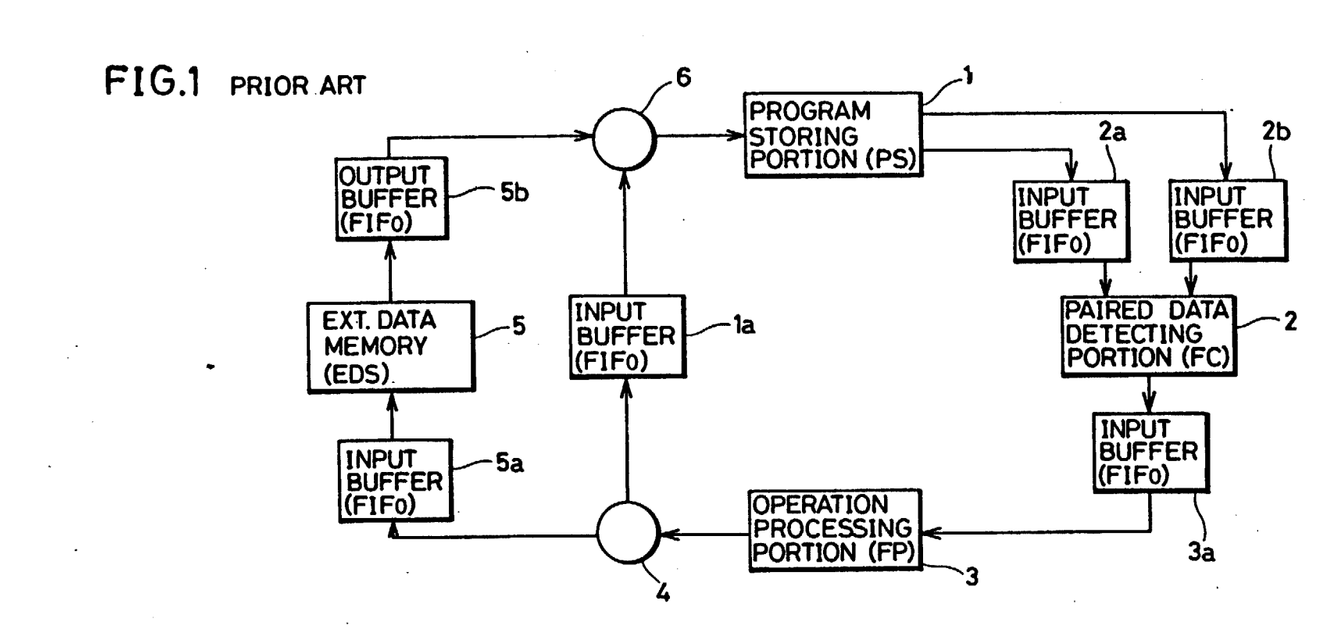
FIG. 1 is a schematic block diagram of a conventional data flow type information processing apparatus.
Figure 2:
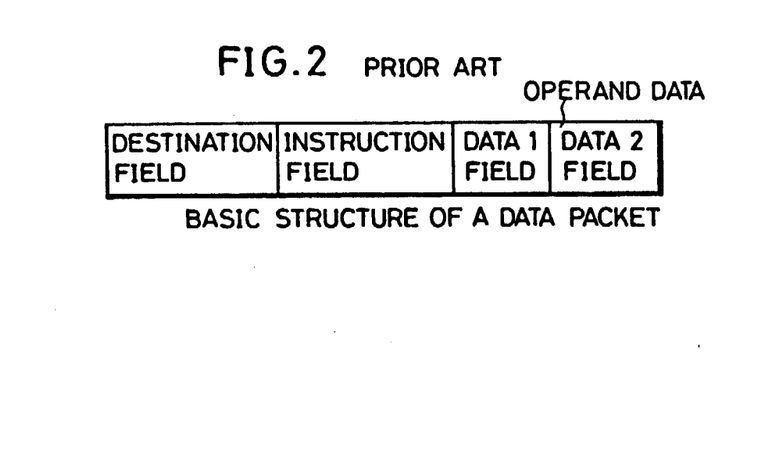
FIG. 2 illustrates a structure of a data packet circulating through respective portions of the information processing apparatus shown in FIG. 1.
Figure 3:
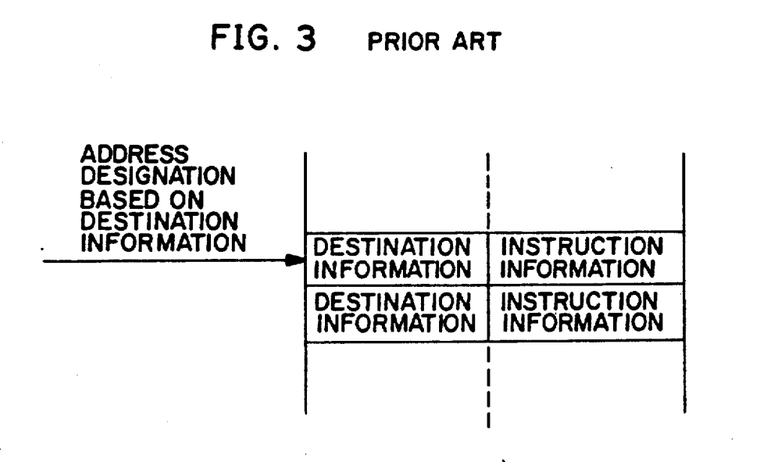
FIG. 3 illustrates a portion of a data flow program stored in a program memory.

Referring to FIG. 1, a program storing portion (PS) 1 includes a program memory, which stores a data flow program including the destination information and the instruction information as illustrated in FIG. 3. The address of the program storing portion 1 is designated in response to the destination information of the data packet, so that the destination information and the instruction information are read and each piece of information is stored in the destination field and in the instruction field of the data packet to be applied to FIFO input buffers 2a and 2b.

A paired data detector (FC) 2 queues data packets inputted from the programs storing portion 1 through the input buffers 2a and 2b for storing operand data of one of the two data packets, where a hit of destination information occurs, into a data field of the other packet and outputting the same to an FIFO input buffer 3a. On this occasion, the above mentioned one of the data packet is erased.

An operation processing portion (FP) 3 decodes instruction information of the data packet inputted from the paired data detecting portion 2 through the input buffer 3a, and performs predetermined processing for the two operand data of the paired data, so that the result is stored in a data field of the data packet and the same is outputted to a branching portion 4.

The branching portion 4 applies the data packet to an FIFO input buffer 1a or to an external data memory (EDS) 5 through an FIFO input buffer 5a in response to the destination information of the data packet. The data packet from the input buffer 1a or the data packet outputted from the external data memory 5 through an output buffer 5b is applied to a junction 6, which applies the data packets to the program storing portion 1 in the order of receipt thereof.

In the data flow type image processing apparatus illustrated n FIG. 1, the operating process proceeds in accordance with the program stored in the program storing portion 1 while the data packet circulates along the path of the program storing portion 1→the paired data detecting portion 2 →the operation processing portion 3 →the branching portion 4 (→the external data memory 5) →the junction 6 →the program storing portion 1 . . . .

Figure 4:
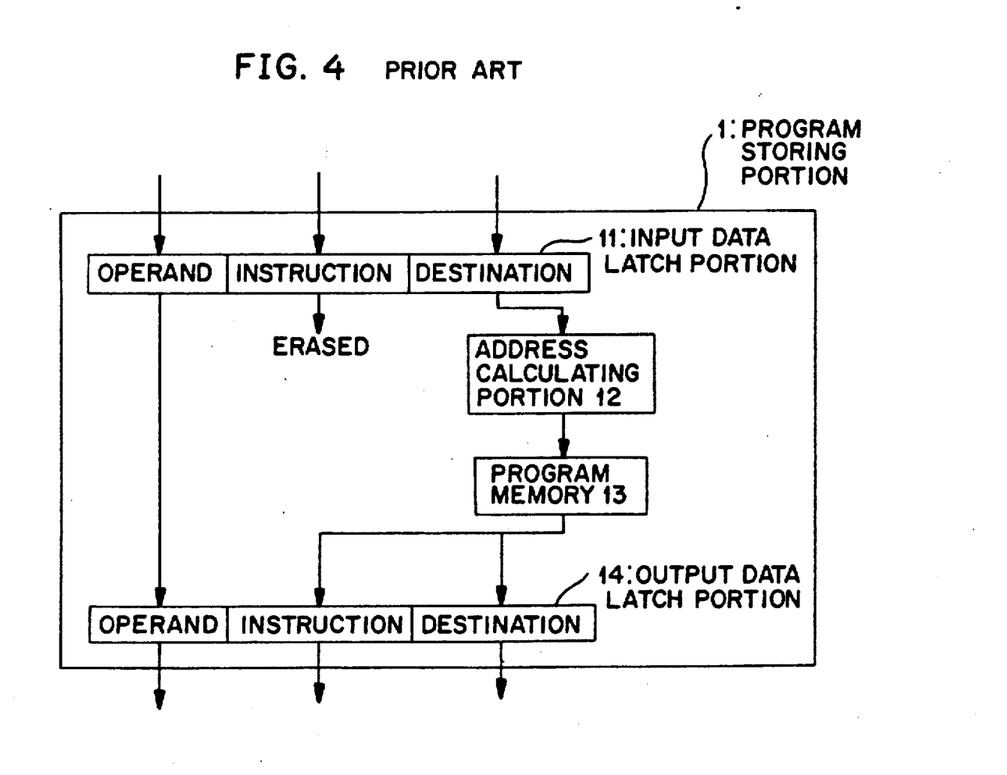
FIG. 4 is a block diagram illustrating a structure of a program storing portion of the data flow type image processing apparatus.

FIG. 4 illustrates a schematic structure of the program storing portion 1 illustrated in FIG. 1. Referring to FIG. 4, an input data latch portion 11 holds the destination information and the operand data of the data packet, and the instruction information is erased. Responsive to the maintained operand and the destination information, new destination information and an instruction information derived from the program memory 13 are applied to the output data latch portion 14 to be latched. The destination information latched in the input data latch portion 11 is applied to an address calculating portion 12, so that the address of the program memory 13 is calculated from the destination information. The program memory 13 stores a data flow program including the destination information and the instruction information, as illustrated shown in the above described FIG. 3, and the new destination information and the instruction information are applied to the output data latch portion 14 in response to the above mentioned address.

In the above described data flow type information processing apparatus, the execution of an instruction is permitted as soon as all the data for the operation are prepared, and the program proceeds in parallel and non-synchronously in accordance with the natural flow of data. When, a source program written to be carried out on a common von Neumann computer is developed into a data flow program, the order of execution is not always the same as the order of execution in the non-von Neumann computer. A problem thereby results, that is, the errors in the operation program cannot be found or corrected by a simple tracing of the program. It is more difficult to find errors, if any, in executing the developed data flow program, and it is also very difficult to know the relation with the source program.

SUMMARY OF THE INVENTION

Therefore, a main object of the present invention is to provide a debugging apparatus for effectively carrying out debugging of a data flow program which can be executed in a data flow type information processing apparatus.

Another object of the present invention is to provide a debugging apparatus for effectively debugging a source program line by line in order to check the operation of a data flow program.

A further object of the present invention is to provide a debugging apparatus for effectively debugging a source program by every variable written therein to check the operation of the data flow program.

Briefly stated, the present invention comprises program storing means, program executing means, state storing means, data transition storing means, debug information storing means, debug information displaying means and controlling means. The program storing means stores a data flow program. The program executing means comprises a plurality of functional portions executing, in simulation, functions corresponding to a plurality of portions in the processing apparatus, and the executing means executes sequentially the data flow program stored in the program storing means. The state storing means stores data representing the state of execution corresponding to respective lines of the source program of the plurality of functional portions in the program executing means. The data transition storing means stores data representing the state of execution and data for processes in respective functional portions of the program executing means employed for executing the data flow program at respective lines of the corresponding source program. The debug information storing means stores debug information indicating correspondence between respective lines of the source program with respective nodes of the data flow program. The controlling means controls the program executing means, the state storing means and the data transition storing means in response to the debug information stored in the debug information storing means. The debug information indicating means indicates debug information in association with the respective program unit of the source program in relation to the execution of respective nodes of the data flow program.

Therefore, according to the present invention, the source program corresponding to the successively executed data flow program can be displayed for forming program units indicative of the correspondence between the source program and the data flow program. In the simulated execution of the program, the data flow program successively proceeds every time a program unit of the corresponding source program is executed and terminated, data representing the states of respective portions of the data flow type information processing apparatus and the data in association with the transition of the data are successively stored in the state storing means and in the data transition storing means. As a result, the order of execution and information in association with the executed contents of the source program corresponding to the data flow program can be provided.

In a preferred embodiment of the present invention, data generating means for generating data employed in executing the data flow program is provided, and the program executing means successively executes the data flow program stored in the program storing means by using the data generated from the data generating means.

In accordance with a more preferred embodiment of the present invention, lines or variables written in the source program are used as the program unit.

Therefore, in accordance with the more preferred embodiment of the present invention, the state of processing the line or variable written in the source program can be displayed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 5:
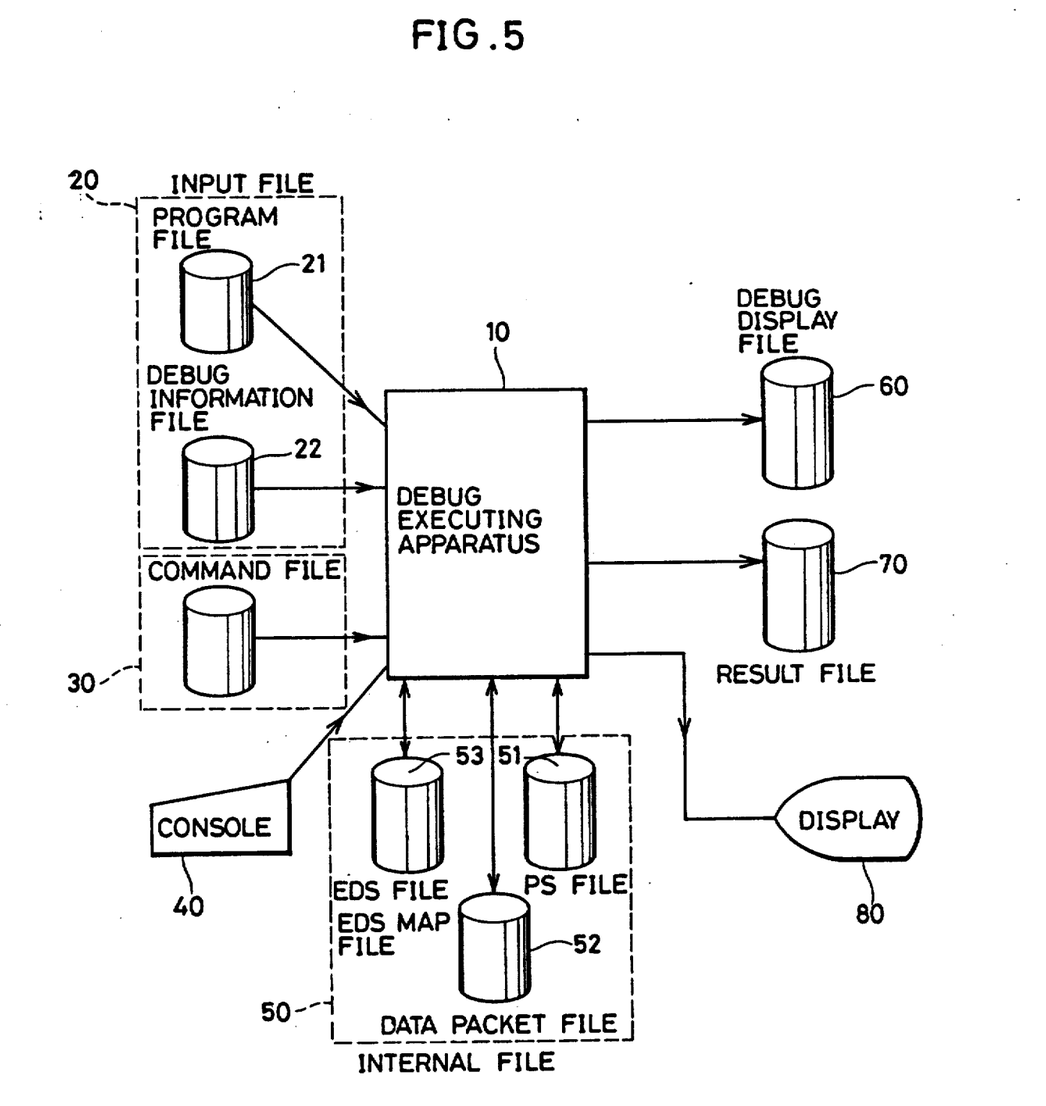
FIG. 5 is a schematic block diagram of one embodiment of the present invention.

FIG. 5 is a schematic block diagram of one embodiment of the present invention. Referring to FIG. 5, a debugging apparatus 10 simulates the internal operation of the data flow type information processing apparatus, and the debugging apparatus 10 successively executes the data flow program stored in a program file 21, which will be described later, in accordance with every line of the corresponding source program. A general central processing apparatus (von Neumann computer) may be used as the debugging apparatus 10. An input file 20, a command file 30, a console 40, an internal file 50, a debug display file 60, a result file 70 and a display 80 are connected to the debugging apparatus 10.

The input file 20 contains a data flow program to be carried out by the debugging apparatus 10 and data required for the apparatus to carry out debugging. The input file 20 includes a program file 21 and debug information file 22. The program file 21 stores an object program of the data flow program and the data used therefor. The debug information file 22 stores a source program list and information indicative of the correspondence between the source program and the object program developed for the data flow type. The command file 30 is provided for storing various instructions in association with debugging, and groups of commands executed by batch processing are loaded therein.

The console 40 serves to input through keys various instructions in association with the debugging. The internal file 50 is provided for storing various information employed in the debugging apparatus 10, and the internal file 50 includes a PS file 51, a data packet file 52 and an EDS file•EDS map file (hereinafter referred to an EDS file) 53. The PS file 51 and the EDS file 53 store data representing the state of execution, and the data packet file 52 stores data representing processes and the states of execution. The PS file 51 stores a data flow program, which is the object program provided from the program file 21 converted into a form for execution in the debugging apparatus 10. The data packet stored in the data packet file 52 corresponds to the data packet circulating through respective portions of the, data, flow type information processing apparatus illustrated in FIG. 1. The EDS file 53 stores the contents of the portion corresponding to the external data memory 5 illustrated in FIG. 1 and the information in association with the allotment of memory regions.

The debug display file 60 stores changes of the display during debugging by the debugging apparatus 10, and the result file 70 stores the result of execution of the data flow graph by the debugging apparatus 10. Therefore, the results of the operation process based on the data flow program are stored in the result file 70. The display 80 displays the content of the debug display file 60, the contents of the result file 70 and messages.

The object program applied from the program file 21 is converted into a data flow program, which can be executed by the debugging apparatus 10, to be stored in the PS file 51. The data applied from the program file 21 are stored in the data packet file 52. The debugging by the debugging apparatus 10 illustrated in FIG. 5 is carried out in accordance with commands inputted through the console 40 or the commands stored in the command file 30.

Figure 6:
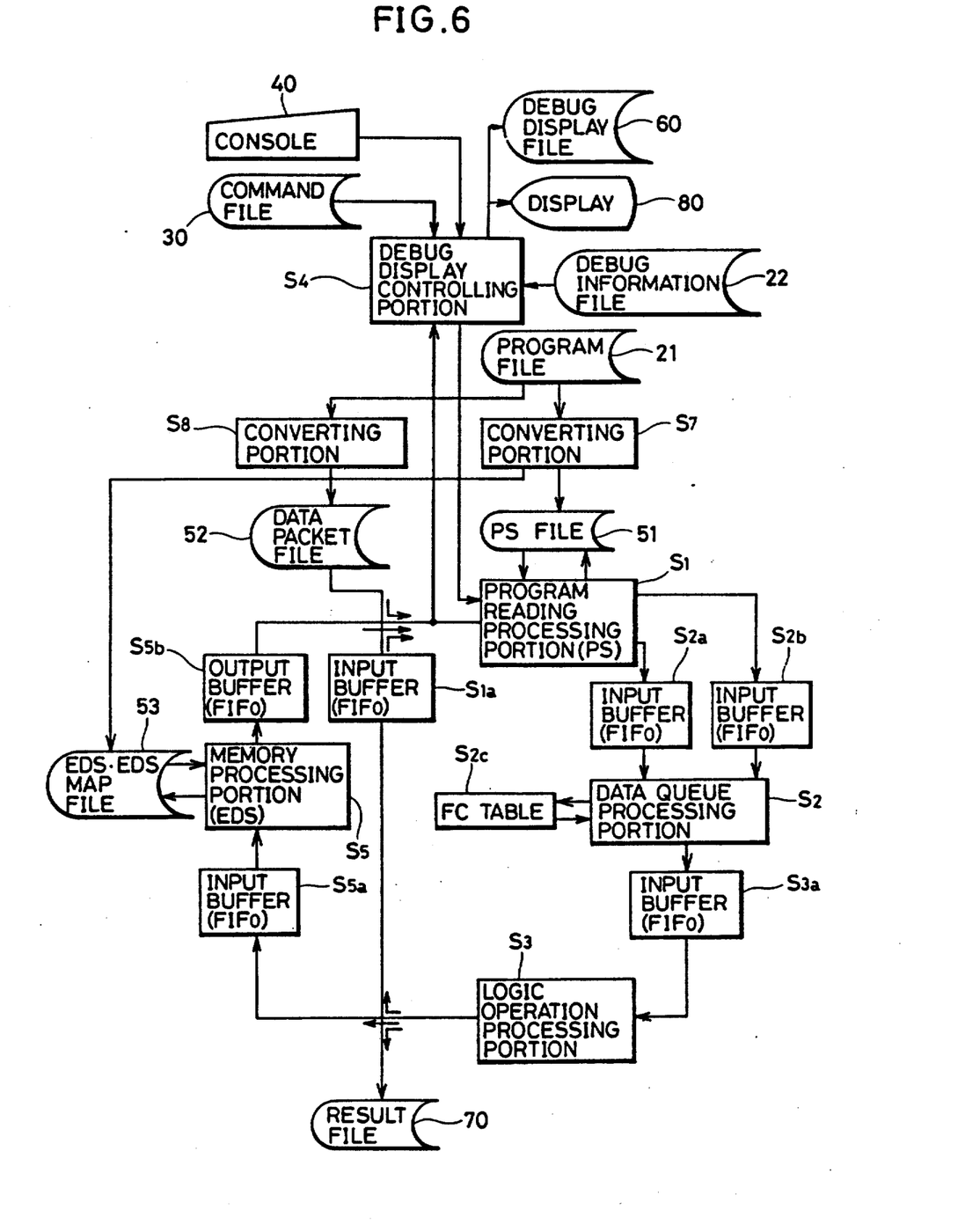
FIG. 6 is a flow chart illustrating structures of respective functional portions of the debugging apparatus illustrated in FIG. 5.

FIG. 6 is a flow chart illustrating showing structures of respective functional portions of the debugging apparatus 10 illustrated in FIG. 5.

Referring to FIG. 6, the object program applied from the program file 21 is converted into a data flow program which can be executed by the debugging apparatus 10 by a converting processing portion S7 to be stored in the PS file 51. The data provided from the program file 21 are converted into data packets by the converting processing portion S8 to be stored in the data packet file 52.

The destination information and the instruction information are read from the PS file 51 by an address designation in accordance with the destination information of the data packet provided from the data packet file 52 and the program reading processing portion (PS) S1, and the respective information is stored in the destination field and the instruction field of the data packet to be outputted. Namely, the program reading processing portion S1 and the PS file 51 carry out an operation corresponding to that of the program storing portion 1 illustrated in FIG. 1.

A data queue processing portion (FC) S2 queues the data packets applied from the program reading processing portion S1 through input buffers S2a and S2b by using an FC table S2C, and the operand data of one of the two data packets in which a hit of destination information occurs into a prescribed data field of the other data packet to output the same. Namely, the data queue processing portion S2 and the FC table S2C carry out an operation corresponding to that of the paired data detecting portion 2 of FIG. 1.

The logic operation processing portion (FP) S3 decodes the instruction information of the data packet inputted from the data queue processing portion S2 through the input buffer S3a, carries out a predetermined operation on the two operand data, and stores the result in the data field of the data packet to output the same. Namely, the logic operation processing portion S3 carries out the operation of the operating processing portion 3 of FIG. 1. The data packet is applied to the program reading processing portion S1 through the input buffer S1a or the memory processing portion S5 through the input buffer S5a.

The memory processing portion (EDS) S5 updates the content of the EDS file 53 in accordance with the provided data packet, and applies a new data packet to the program reading processing portion S1 through the output buffer S5b. Namely, the memory processing portion S5 and, EDS file 53 carries out an operation corresponding to the external data memory 5 illustrated in FIG. 1. The input buffers S1a, S2a, S2b, S3a and S5a and the output buffer S5b respectively correspond to the input buffers 1a, 2a, 2b, 3a and 5a and the output buffer 5b illustrated in FIG. 1.

The contents in the input buffers S1a, S2a, S2b, S3a and S5a, the output buffer S5b and the FC table S2c during execution of the data flow program are stored in a debug display file 60 by the debug display controlling portion S4, and the stored contents are displayed on a display 80. The results of operation processes in accordance with the data flow program are stored in the results file 70.

The simulation by the debugging apparatus 10 illustrated in FIG. 6 is carried out in accordance with commands through the console 40 or stored in the command file 30 illustrated in FIG. 5.

Figure 7:
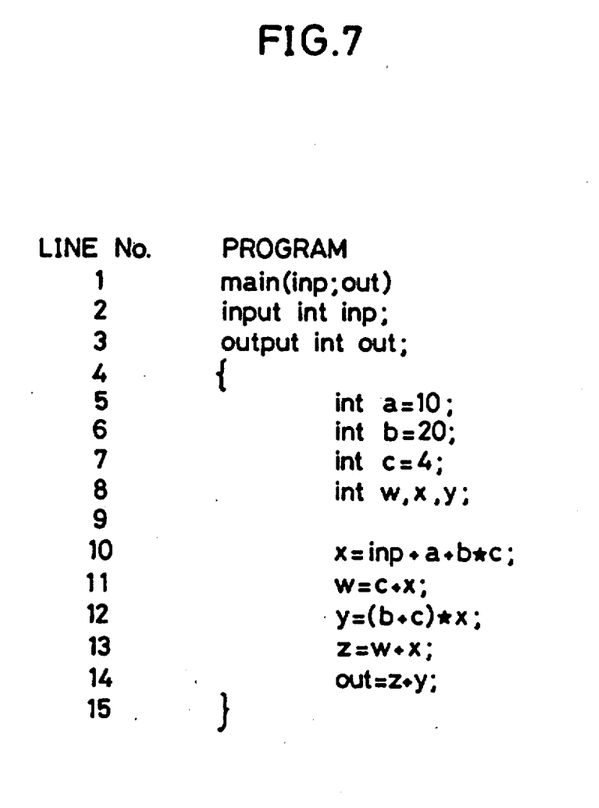
FIG. 7 illustrates an example of a source program.
Figure 8:
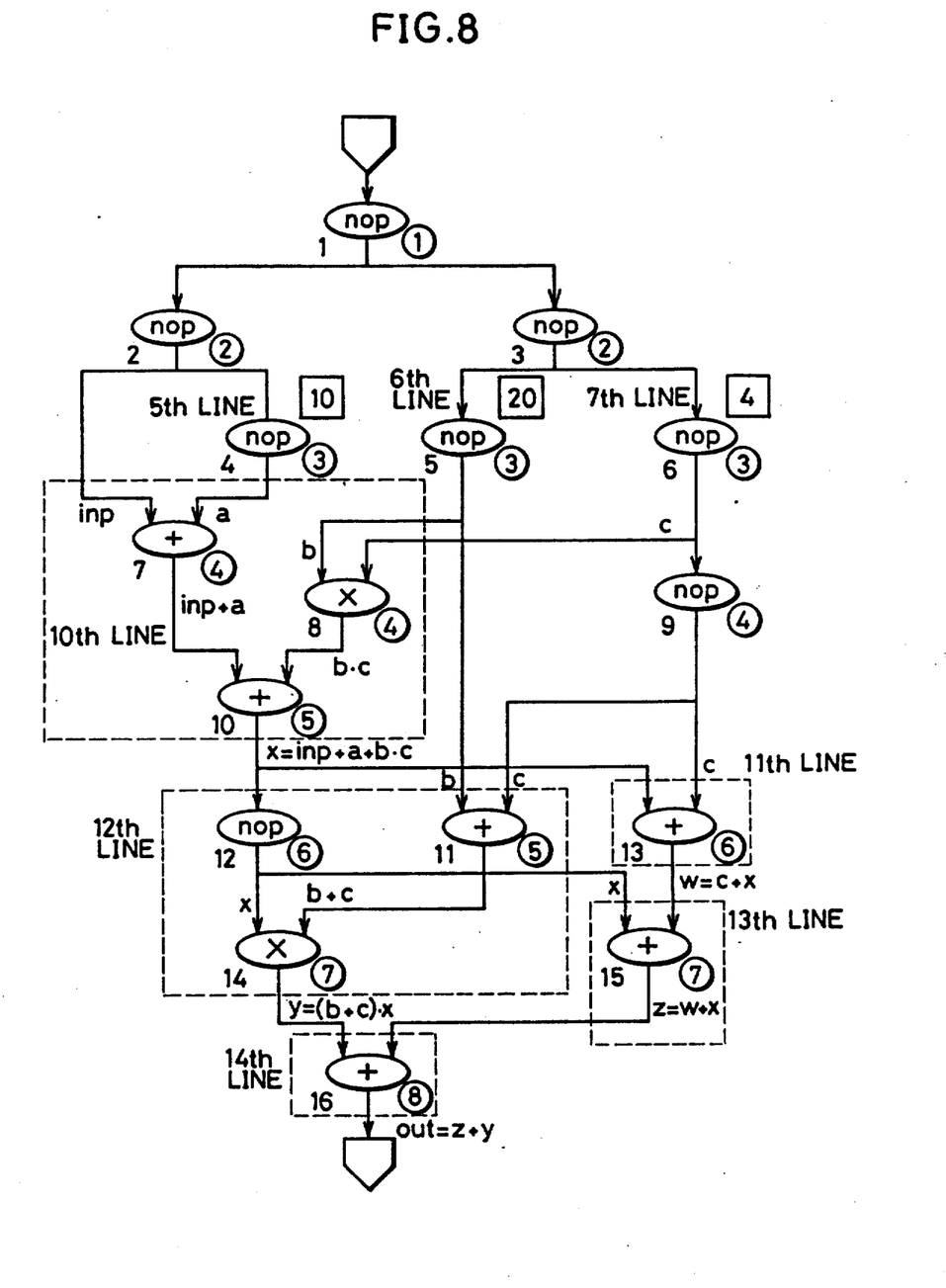
FIG. 8 illustrates an example of the source program illustrated in FIG. 7 developed into a data flow program.
Figure 9:
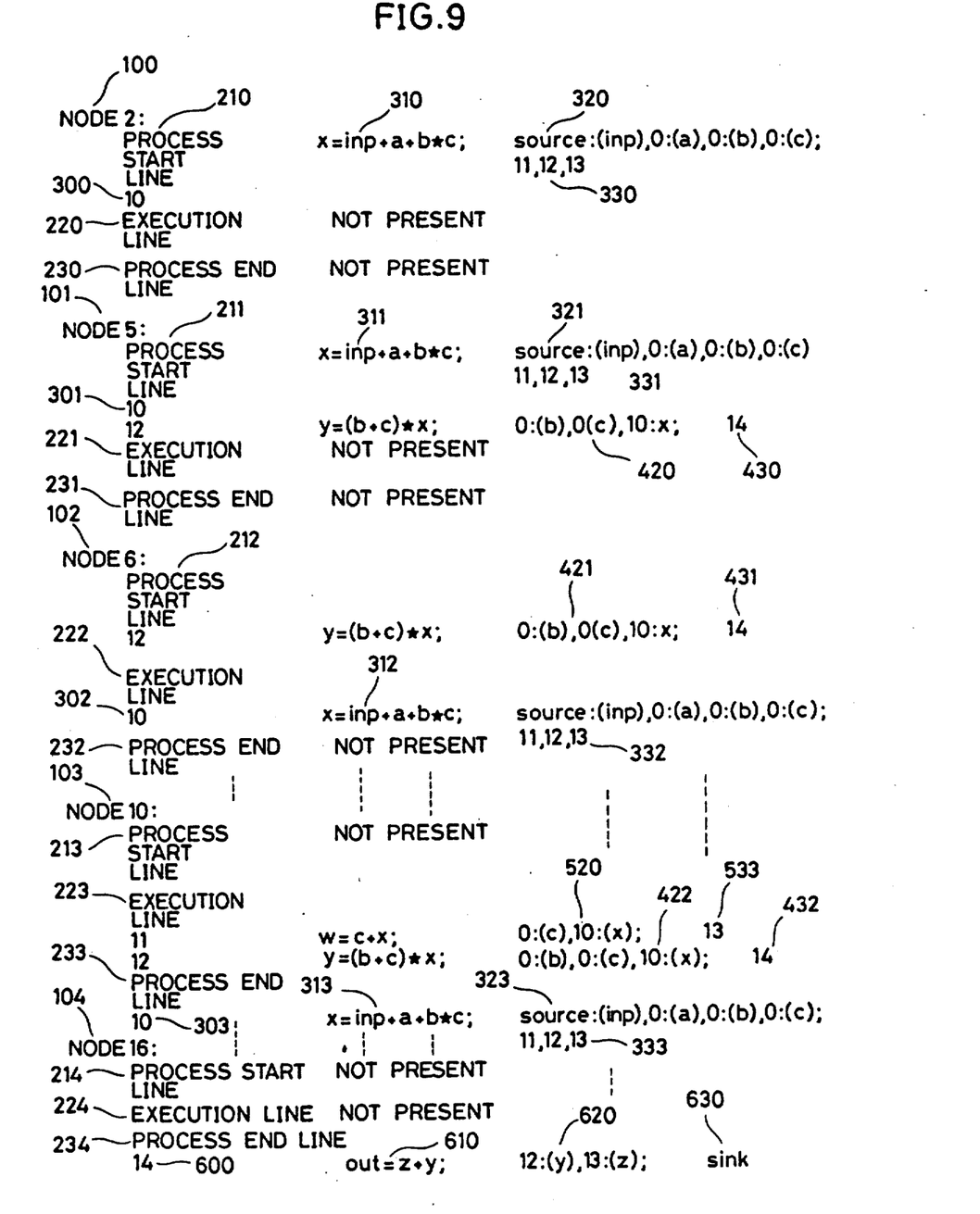
FIG. 9 is an example of the display for the results from debugging in accordance with one embodiment of the present invention.

FIG. 7 illustrates an example of the source program which is debugged by the debugging apparatus illustrated in FIG. 5, FIG. 8 illustrates a flow graph based on the source program illustrated in FIG. 7, and FIG. 9 illustrates an example of results of debugging in accordance with one embodiment of the present invention.

In the flow graph illustrated in FIG. 8, the numerals in circles on the right side represent ranks of execution, and the numerals on the left side are node numbers in accordance with the priority of the ranks of execution. The program in accordance with the present invention proceeds in accordance with the node number. Therefore, when the program is executed in accordance with the node numbers, the debug information is displayed as illustrated in FIG. 9 as the debugging proceeds for the source program illustrated in FIG. 7.

The display format of FIG. 9 will be described with reference to the node 2 illustrated at the position 100. The information displayed thereon represents the information when the node 2 is executed.

During debugging, display in association with the executed node number 100, a process start line 210, an execution line 220 and a process end line 230 are provided as illustrated in FIG. 9. The process start line 210 indicates the line of the source program in which data is prepared for any one of the nodes belonging thereto. The execution line 220 indicates a line of the source program in which data are prepared for all the input nodes of the nodes belonging thereto. The input node indicates a node directly connected to a node such as a node belonging to another line, which does not belong to the same line. The process end line 230 indicates a line of the source program in which all the nodes belonging thereto are executed.

The above described three lines are all displayed in accordance with a similar format which is described as follows. The number 10 displayed at the left most position 300 represents the line number of the source program. The position 310 in the right thereof represents the content of the source program described on the 10th line. The position 320 in the right thereof illustrates all the variables existing in the line, which are (line number of output source) : (variable), respectively.

When the variable is in brackets ( ), the variable represents that the value of the variable is stable. The display "source" at the position 320 indicates a source such as an input to the program. The position 330 therebelow represents the number of lines on that instructions which will be successively processed for respective variables are described. Because there are a plurality of lines, the numbers are displayed distinguished by ",". The above mentioned three types of lines 210, 220 and 230 are all displayed in accordance with the above format.

In accordance with the above described format, the display of information in association with the respective lines, i.e., the process start line 210, the execution line 220 and the process end line 230 are changes as illustrated in FIG. 9, as the debugging proceeds. The process on the line 10 will be described as follows. At first, the node 2 shown at the position 100 is executed, and the information $x=inp+a+b\cdot c$ in association with the line 10 is displayed on the process start line 210. Thereafter, the node 6 is executed, and the display $x=inp+a+b\cdot c$ moves to the line 222 indicative of the line being executed, and thereafter the node 10 is executed and the display moves to the process end line 233. The display is changed as described above for all the lines and the debugging is continued.

How the display changes as each of the nodes is executed will be described in detail as follows. As illustrated in FIG. 8, the data are transmitted to the node 7 as the node 2 is executed. Therefore, the line 10 to which the node 7 belongs is displayed at the process start line 210. On that occasion, the variables a, b and c belonging to the line are all stable, and therefore the variables displayed at the position 320 are all in brackets ( ).

Thereafter, when the node 5 is executed, data having the stable value of the variable b are transmitted to the node 11 belonging to the line 12, so that the line 12 is displayed at the process start line 211. A variable "x" belonging to the line 12 displayed at the position 420 is not in the brackets ( ). This is because the value has not yet been determined because the line 10 providing the value has not yet been terminated.

Thereafter, the node 6 is executed and the data having the stable value of the variable c are transmitted to the node 8. Therefore, all the data have been prepared for all the input nodes 7 and 8 belonging to line 10, and therefore the line 10 is displayed at the execution line 222. As described above, the input node indicates that a node having another node which does not belong to the same line as the output source. As for the line 10, the nodes 7 and 8 are the input nodes. The nodes 2 and 4 which are the output sources of the input node 7 and the nodes 5 and 6 which are the output sources of the input node 8 have been executed by this time point, and therefore data have been prepared for both input nodes 7 and 8. The program is further executed, and when the node 10 is executed, all the nodes 7, 8 and 10 belonging to the line 10 have been executed, and therefore the line 10 is displayed at the process end line 233. As a result, the value of the variable "x" is determined, so that the variable "x" displayed at the positions 422 and 520 on the lines 11 and 12 and displayed at the execution line 223 is displayed in the brackets ( ).

As the program is executed in this manner, the respective information display is also changed. Finally, the execution of the node 16 terminates the execution of the equation on the 14th line, which is the last line, of the source program. The line 14 is displayed at the process end line 234, and the data flow program employed herein as an example is terminated. The destination of the variable "out" outputted from the 14th line is the output of the program, so that "sink" is displayed as destination line number 630.

As described above, in accordance with the above described embodiment, debugging is carried out on every line of the source program, so that the order of execution and the information of execution represented by the variables of the source program corresponding to the execution of the data flow program can be obtained without checking in detail the object data flow program. Therefore, development of the data flow program can be easily and accurately carried out. In the foregoing, debugging of the source program is carried out line by line. Debugging of the source program may be carried out on variable by variable. An embodiment employing such method will be described as follows.

Figure 10:
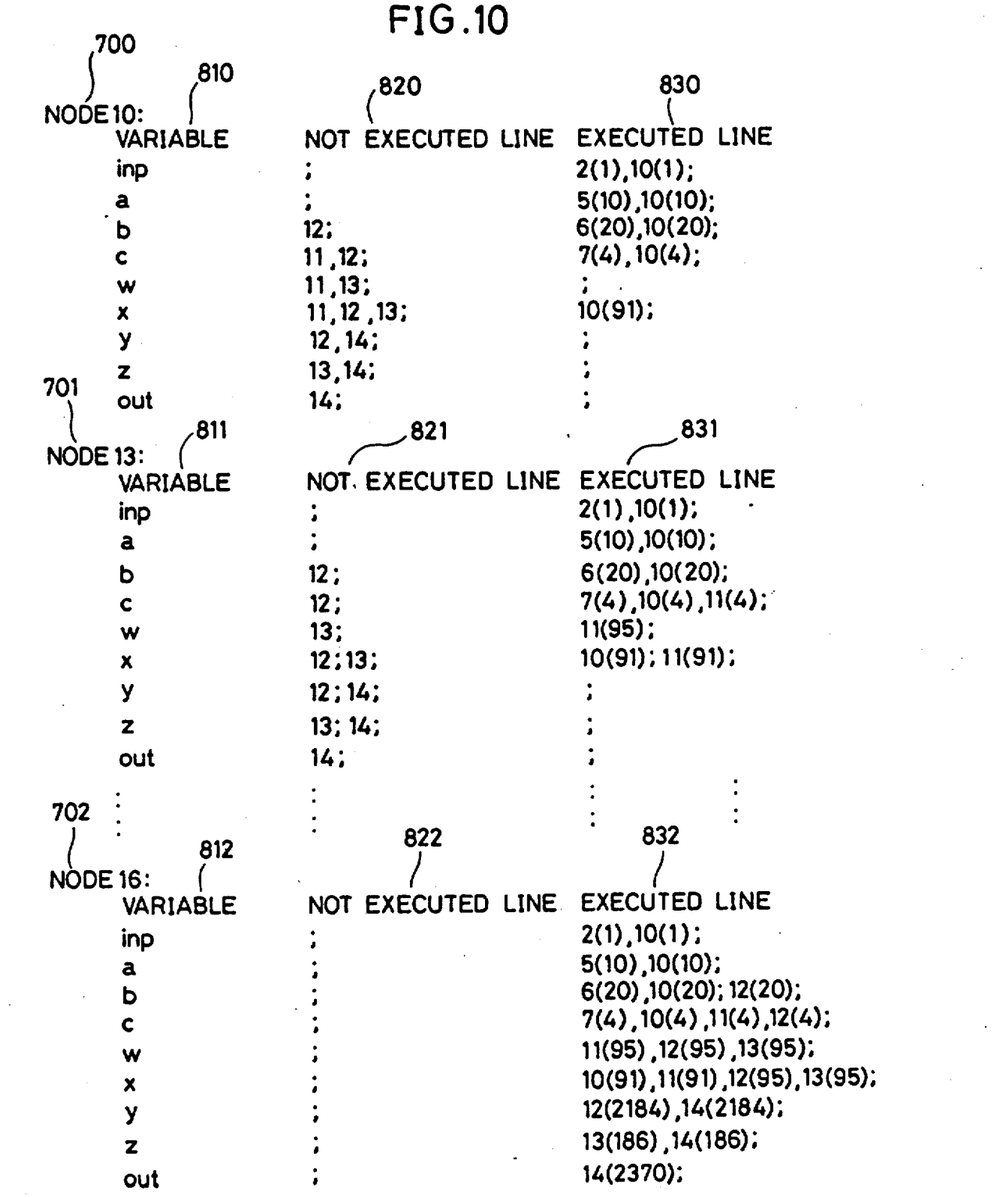
FIG. 10 shows another example of display of the results from debugging in accordance with another embodiment of the present invention.

FIG. 10 illustrates an example of display of the results of debugging carried out on every variable described in the source program. In this example also, debugging is carried out on the source program illustrated in FIG. 7 developed into the data flow program illustrated in FIG. 8.

Referring to FIG. 10, the display format will be described. During debugging, the number of the node which is being executed is displayed at the position 700, all the variables belonging to the function which is being checked are displayed at the position 810, and all the lines in the source program to which the variables belong are displayed at positions 820 and 830. The lines which have not yet been executed are displayed at the position 820 and the lines which have been executed are displayed at the position 830.

The line 820 which has not yet been executed indicates the line which has not yet been executed in the manner of execution developed in the data flow program out of all the lines in the source program to which the variables displayed at 810 belong. The line number is displayed at that position. Since the line has not yet been executed, the value of the concerned variable is not yet determined, naturally.

The line 830 which has been executed indicates the line which has been executed out of all the lines of the source program to which the variables displayed on 810 belong, and the number of the line is displayed at that position. Since the line has been executed, the value of the variable determined as the result of execution is displayed in brackets. There may be a plurality of executed lines and non-executed lines 820 and 830, respectively, so that a plurality of values are displayed distinguished by ", ", respectively.

The number of nodes 100 which has been executed, the variable 810, the lines 820 which have not yet been executed and the lines 830 which have been executed have displays that are changed as the data flow program proceeds, as illustrated in FIG. 10. More specifically, the information displayed in accordance with the execution of the node 10 illustrated in FIG. 8 is changed by the execution of the node 13 such as the variables 811, the lines 821 which have not yet been executed and the lines 831 which have been executed, and finally, the information is changed by the execution of the node 16 such as the variables 812, the lines 822 which have not yet been executed and the lines 832 which have been executed. Thus the lines required for debugging are successively provided.

How the displays are changed in accordance with the execution of respective nodes will be described in detail as follows. The value of the variable "x" is determined by the execution of the node 10, so that the line number 10 in association with the variable "x" displayed at the position of the non-executed line 820 is displayed at the executed line position 830 together with the result of calculation (91). At the same time, the displays of the variables "inp", "a", "b" and "c" belonging to the line 10 are also moved from the position of the non-executed line 820 the executed line 830. However, the values of these variables other than the variable "x" are not changed, so that the values of these variables displayed in the brackets are not changed.

When the node 13 illustrated in FIG. 8 is executed and the operation of the equation $w=c+x$ of the 11th line is terminated, the value of the variable "w" is determined. Therefore, the display of the variable is moved from the non-executed line 821 to the executed line 831, and the result of the calculation (95) is displayed in the brackets ( ). Displays of other variables "c" and "x" belonging to the 11th line are also moved.

Finally, the equation $out=z+y$ of the 14th line is terminated by the execution of the node 16 and the value of the output variable "out" displayed on the position of the variable 812 is determined as (2370) as described on the position of the executed line 832, and the data flow program used as an example is terminated. In addition to the variable "out", the displays of the variables "y" and "z" are moved from the non-executed line 822 to the executed line 832. Thus all the values of the variables are determined and the displays are moved.

The debug information is provided as described above, and the order of execution and the information for execution of the source program carried out in the data flow type information processing apparatus are provided.

As described above, according to the present invention, the order of execution of the source program and the changes of the variables, namely, the information in association with the processing and execution of the source program corresponding to the execution of the data flow program can be provided. Therefore, development of the data flow program can be readily and accurately carried out.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for debugging a data flow program at every program unit of a source program to check an operation of the data flow program, comprising:
   program storing means for storing said data flow program;
   program executing means including a plurality of functional portions for simulating functions corresponding to a plurality of structural portions in a processing apparatus carrying out said data flow program, for successively executing said data flow program stored in said program storing means for every program unit of the corresponding source program;
   state storing means for storing data representing a state of execution corresponding to each program unit of said source program of said plurality of functional portions of said program executing means;
   data transition storing means for storing data representing processes and states of execution, at respective functional portions of said program executing means, of the data employed for executing said data flow program at each corresponding program unit of said source program;
   debug information storing means for storing debug information indicative of a corresponding relation between each program unit of said source program and each node of said data flow program;
   debug information displaying means for displaying said debug information in association with each program unit of said source program in association with execution of each node of said data flow program; and
   control means for controlling said program executing means, said state storing means and said data transition storing mans in association with debug information stored in said debug information storing means.

2. An apparatus for debugging a data flow program according to claim 1, further comprising:
   data generating means for generating data employed for executing said data flow program;
   wherein said program executing means comprises means for successively executing said data flow program stored in said program storing means by using data generated from said data generating means.

3. An apparatus for debugging a data flow program according to claim 1, wherein
   said program unit comprises a line described in said source program.

4. An apparatus for debugging a data flow program according to claim 1, wherein
   said program unit comprises a variable described in said source program.

* * * * *